(12) United States Patent
Ormond et al.

(10) Patent No.: US 6,183,544 B1
(45) Date of Patent: Feb. 6, 2001

(54) AIR FILTER WITH REINFORCED PRESSURE TAP

(75) Inventors: Theodore W. Ormond; Mark V. Holzmann; Jeffrey S. Morgan, all of Stoughton, WI (US)

(73) Assignee: Nelson Industries, Inc., Stoughton, WI (US)

( * ) Notice: Under 35 U.S.C. 154(b), the term of this patent shall be extended for 0 days.

(21) Appl. No.: 09/358,221

(22) Filed: Jul. 21, 1999

Related U.S. Application Data

(63) Continuation-in-part of application No. 09/037,248, filed on Mar. 9, 1998.

(51) Int. Cl.[7] ........................... B01D 46/00; B01D 46/44
(52) U.S. Cl. ................... 96/421; 55/310; 55/482
(58) Field of Search .................. 96/421; 95/19, 95/286; 55/309, 310, 385.3, 482

(56) References Cited

U.S. PATENT DOCUMENTS

| | | |
|---|---|---|
| 1,246,189 | 11/1917 | Vanderlip . |
| 1,351,573 | 8/1920 | Hopwood . |
| 1,614,770 | 1/1927 | Ayling . |
| 2,384,360 | 9/1945 | Allen et al. . |
| 2,980,204 | 4/1961 | Jordan . |
| 3,152,476 | 10/1964 | Criner . |
| 3,363,616 | 1/1968 | Baumgarten . |
| 3,384,109 | 5/1968 | Stroburg et al. . |
| 3,422,679 | 1/1969 | McGowan et al. . |
| 3,443,365 | 5/1969 | Lee et al. . |
| 4,020,783 | 5/1977 | Anderson et al. . |
| 4,179,762 | 12/1979 | Barndardt et al. . |
| 4,186,909 | 2/1980 | Patel . |
| 4,637,825 | 1/1987 | Howeth . |
| 4,702,754 | 10/1987 | Blocker . |
| 5,016,923 | 5/1991 | Adamaitis . |
| 5,275,636 | 1/1994 | Dudley et al. . |
| 5,408,977 | 4/1995 | Cotton . |
| 5,456,834 | 10/1995 | Bowlsbey . |
| 5,525,215 | 6/1996 | Marchionda . |
| 5,858,224 | 1/1999 | Schwandt et al. . |
| 5,882,367 | 3/1999 | Morgan et al. . |
| 5,882,379 | 3/1999 | Johnson . |
| 5,980,618 | * 11/1999 | Holzmann et al. ............... 55/310 |

* cited by examiner

Primary Examiner—Duane S. Smith
(74) Attorney, Agent, or Firm—Andrus, Sceales, Starke & Sawall, LLP

(57) ABSTRACT

An air filter (102) is provided by a housing (104) having an air inlet (106) and an air outlet (108), a main filter element (110) in the housing, a plastic outlet tube (116) having a sidewall (118) with a pressure tap opening (120) therethrough, a plastic fitting tube (122) extending from the plastic outlet tube at the pressure tap opening for receiving a pressure sensor connector (126), and an internal reinforcement member (128,146) in the plastic fitting tube resisting breakage of the latter.

18 Claims, 4 Drawing Sheets

AIR FILTER WITH REINFORCED PRESSURE TAP

CROSS-REFERENCE TO RELATED APPLICATIONS

This application is a continuation-in-part of commonly owned copending U.S. application Ser. No. 09/037,248, filed Mar. 9, 1998.

BACKGROUND AND SUMMARY

The invention relates to air filters, including for internal combustion engines, and more particularly to an air filter with a reinforced pressure tap.

Air filters are known in the prior art, and typically include a cylindrical housing having distally opposite axially ends, and a cylindrical main filter element in the housing, the main filter element having an annular sidewall with a hollow interior and extending between distally opposite axially ends. Air flows radially inwardly through the annular sidewall of the filter element into the hollow interior and then axially through the hollow interior and then exits the housing. An outlet tube extends from the air outlet of the housing and conducts air therefrom. The outlet tube has a sidewall with a pressure tap opening there through communicating between the interior and exterior of the outlet tube, for sensing pressure in the outlet tube, for measuring restriction or pressure drop across the filter element.

In continuing development efforts directed toward weight and/or cost reduction, metal components are increasingly being replaced by plastic components, including housings and/or outlet tubes. In molding air cleaner housings from plastic, it is economical to mold the fitting for the pressure sensor connector or restriction indicator integral with the housing. This eliminates the necessity of producing or purchasing a separate part and assembling it onto the housing. Such integrally molded plastic fitting tube is externally threaded for receiving a pressure sensor connector. In the case of metal air cleaner housings, the fitting is also metal, and is typically welded in place, and is inherently strong. A plastic integral fitting on a molded plastic air cleaner housing will not have the same strength as metal, and is more susceptible to breakage, e.g. due to impact or vibration fatigue.

The present invention addresses and solves the noted breakage problem in a plastic fitting tube extending from a plastic outlet tube of a plastic air filter housing. An internal reinforcement member is provided in the plastic fitting tube resisting breakage of the latter. The reinforcement member extends far enough into the plastic fitting tube to support it at the critical area where it meets the main body of the air cleaner housing. Molded reinforcement structure in the plastic housing is also provided.

BRIEF DESCRIPTION OF THE DRAWINGS

Parent Application

Present Invention

Figure 5:
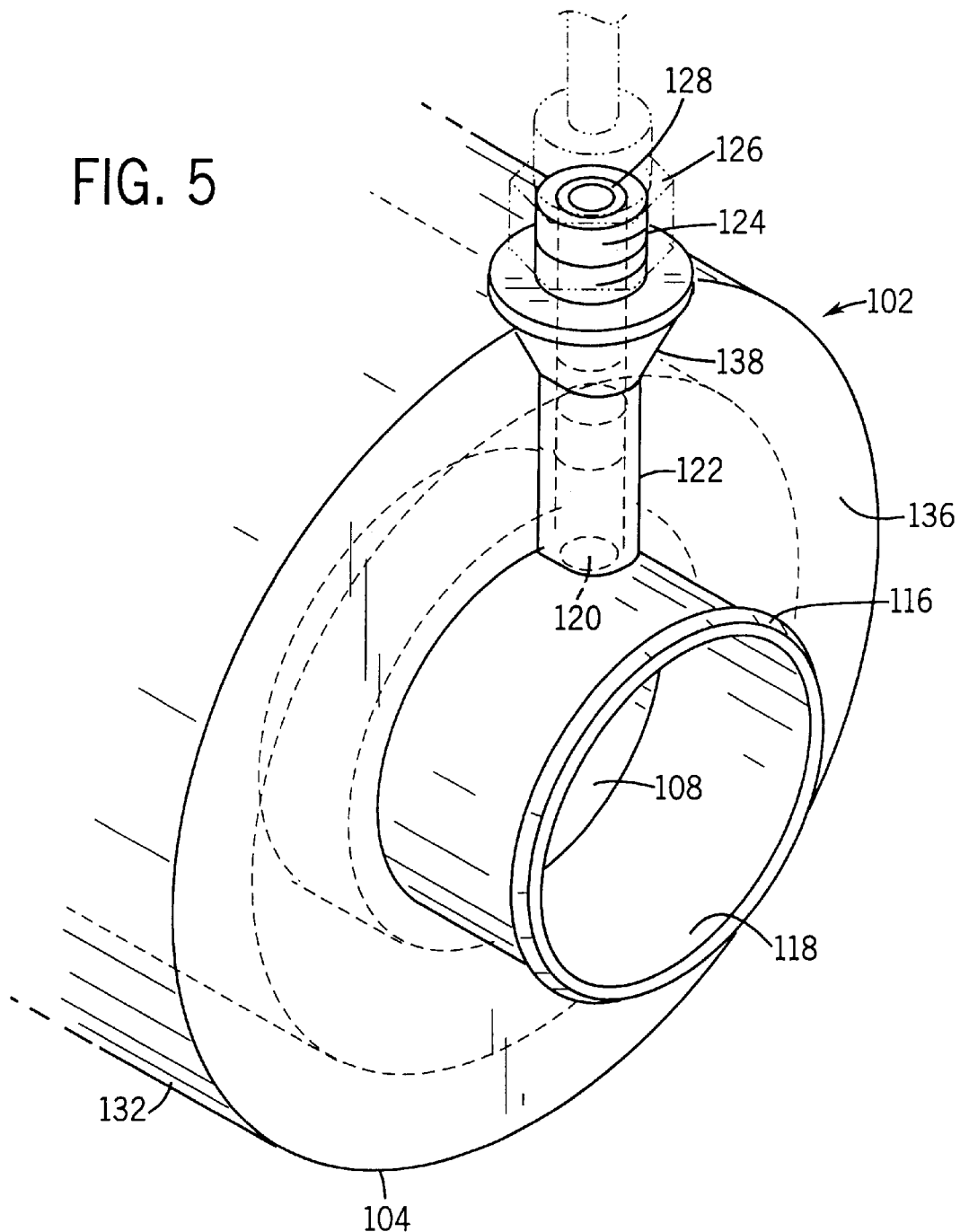

FIG. 5 is a perspective view of a portion of an air filter constructed in accordance with the present invention.

Figure 6:
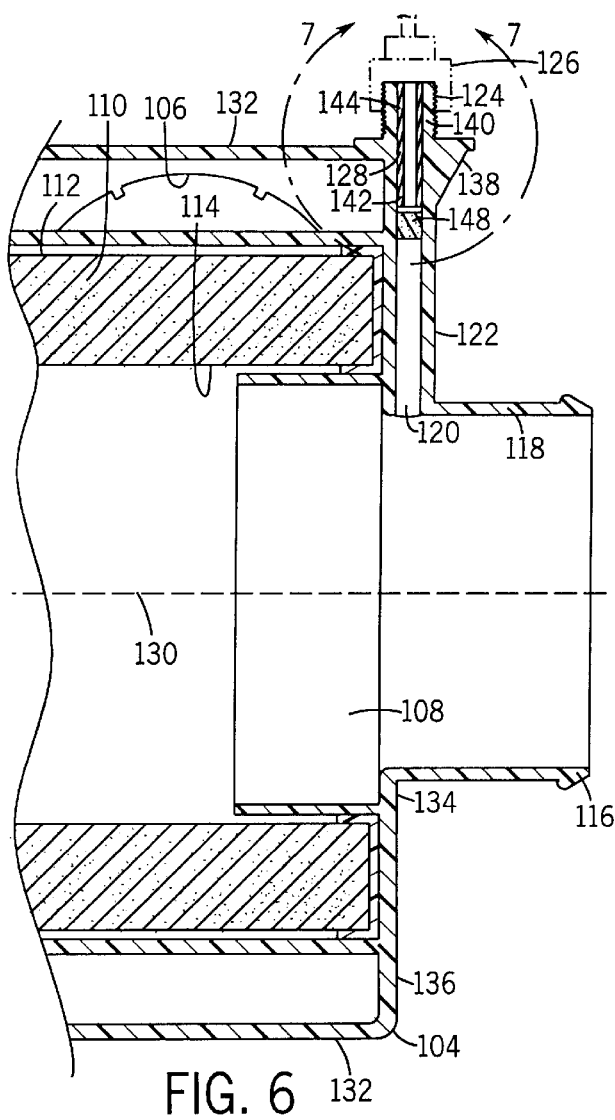

FIG. 6 is a sectional view of the structure of FIG. 5.

Figure 7:
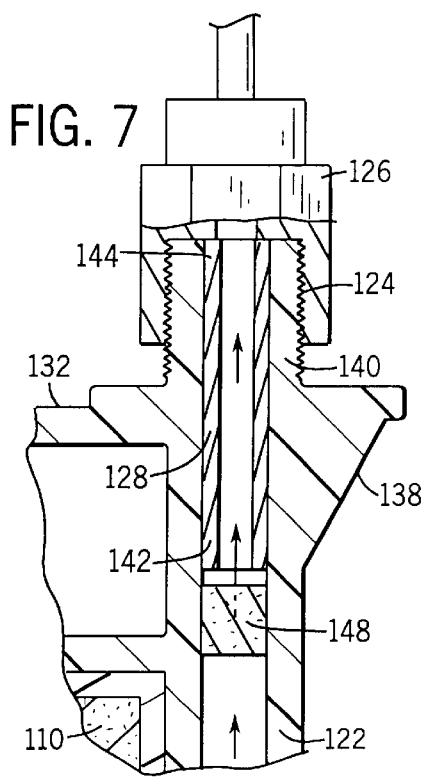

FIG. 7 is an enlarged view of a portion of FIG. 6.

Figure 8:
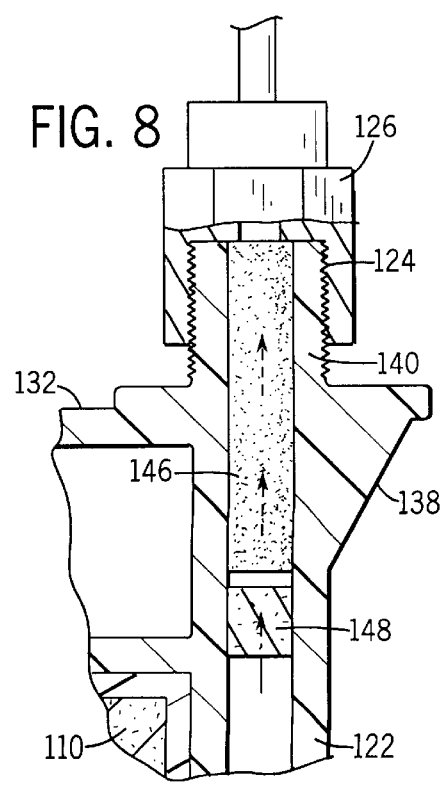

FIG. 8 is like FIG. 7 and shows an alternate embodiment.

DETAILED DESCRIPTION OF THE INVENTION

Parent Application

Figure 1:
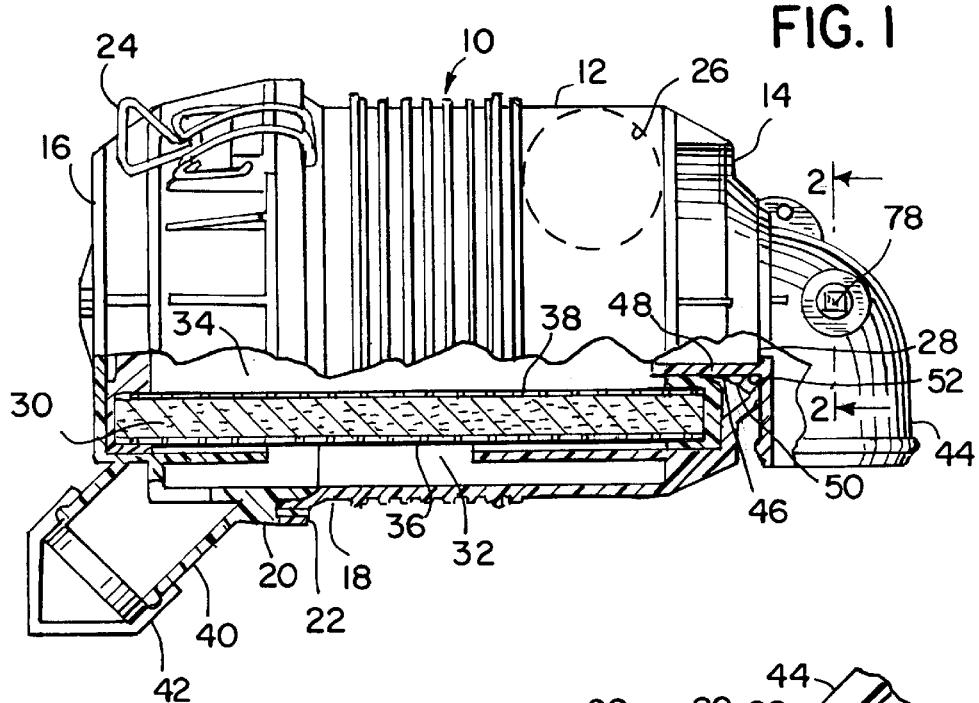
FIG. 1 is taken from the above noted commonly owned copending U.S. application Ser. No. 09/037,248, and is a side elevation view, partly cut away, of an air filter constructed in accordance with the parent invention.

FIG. 1 shows an air filter 10 including a generally cylindrical plastic housing 12 having distally opposite ends 14 and 16. The housing is provided by first and second sections 18 and 20 engaging each other at tongue and groove interface 22 and mounted to each other by a pair of diametrically opposite clamps, one of which is shown at 24. The housing has an air inlet as shown in dashed line at 26 into the sidewall of the housing, and an air outlet 28 at axial end 14 of the housing. A cylindrical main filter element 30 in the housing passes air from air inlet 26 to air outlet 28. Air flows from inlet 26 into the annular space 32 between the housing sidewall and the main filter element 30, then radially inwardly through the annulus of filter element 30 into the hollow interior 34 thereof, then axially rightwardly to outlet 28. Main filter element 30 has a dirty side 36 receiving air from inlet 26 through annular space 32, and has a clean side 38 passing air into hollow interior 34 to outlet 28. The housing has a drain outlet 40 closed by dust ejector valve 42, as is known.

A plastic outlet tube 44, preferably in the form of a 90° elbow, though other configurations may be used, is mounted to right axial end 14 of the housing at air outlet opening 28 in snap-in rotatable relation, as known in the prior art, for example as shown in commonly owned copending U.S. application Ser. No. 08/883,047, filed Jun. 26, 1997, incorporated herein by reference. As shown in such application, member 44 is inserted axially leftwardly into housing 12 until outer wedge shaped lip 46 on inner tubular portion 48 of member 44 moves past inner annular lip 50 of the housing, whereafter the latter snaps back slightly radially inwardly to retain outlet tube 44, with sealing therebetween provided by O-ring 52. Outlet tube 44 extends from air outlet 28 of the housing and conducts air therefrom to an internal combustion engine of a truck, or the like.

Figure 2:
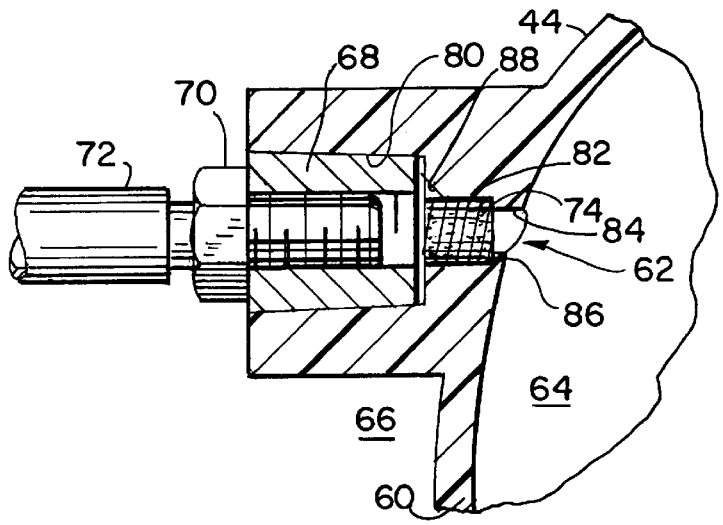
FIG. 2 is an enlarged sectional view taken along line 2—2 of FIG. 1.

Plastic outlet tube 44 has a sidewall 60, FIG. 2, with a pressure tap opening 62 therethrough communicating between the interior 64 and exterior 66 of plastic outlet tube 44, for sensing pressure in the latter. Opening 62 may also provide a vent outlet opening. A fitting 68 is provided in pressure tap opening 62 and is affixed to plastic outlet tube 44, for receiving a pressure sensor connector 70 connected to a pressure sensor (not shown) by hose 72. An auxiliary filter element 74 is provided in pressure tap opening 62 and is affixed to plastic outlet tube 44 and is unaffixed to fitting 68, such that auxiliary filter element 74 remains in pressure tap opening 62 if fitting 68 becomes dislodged from plastic outlet tube 44 and falls out of pressure tap opening 62, such that auxiliary filter element 74 continues to protect the interior 64 of outlet tube 44 and the clean side 38 of main filter element 30 and eliminates a possible contaminating bypass thereto through pressure tap opening 62.

Figure 4:
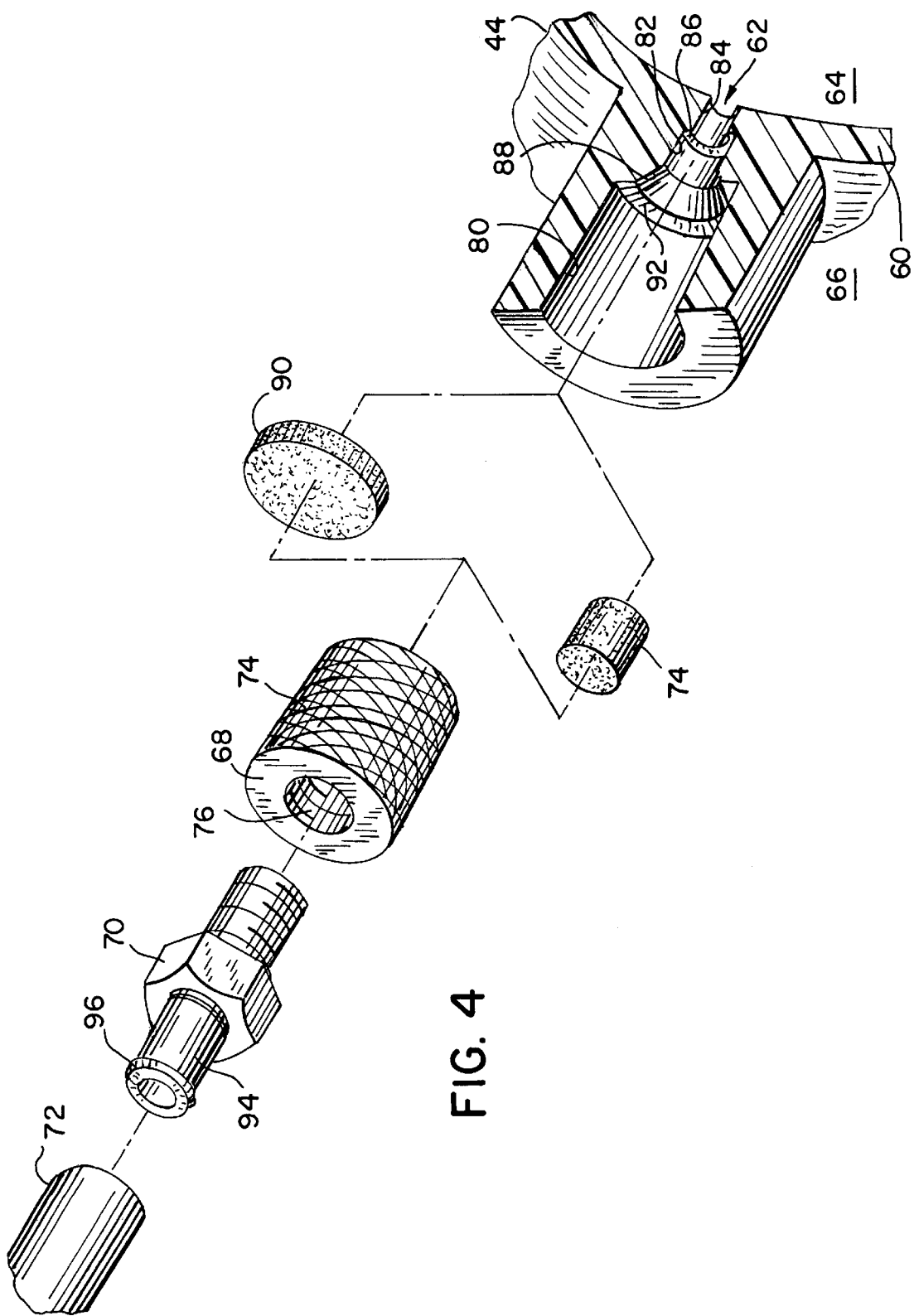
FIG. 4 is an exploded perspective view of the structure of FIGS. 2 and 3.

Fitting 68 is preferably a metal such as brass and is bonded to plastic outlet tube 44, preferably by sonic welding and/or external knurling, as shown at 74, FIG. 4, of fitting 68 and interference fit into the plastic outlet tube, though other materials and bonding techniques may be used. Metal fitting 68 is internally threaded, as shown at 76, FIG. 4, for receiving threaded pressure sensor connector 70 in torqued relation. When pressure sensor 70 is not in use, it may be closed by a cap, or it may be removed from fitting 68 and replaced by a threaded plug or bolt 78, FIG. 1, threaded into fitting 68 in torqued relation. Metal fitting 68 is subject to being overtorqued from connector 70 or plug 78, breaking the bond between plastic outlet tube 44 and metal fitting 68 due to the lower tensile strength of the plastic. Even if fitting 68 becomes dislodged and falls out of opening 62, auxiliary filter 74 remains in place because it is attached to the plastic outlet tube, and is not part of fitting 68 nor otherwise attached thereto. Auxiliary filter element 74 is preferably attached to plastic outlet tube 44 by interference pressfit. In another embodiment, auxiliary filter element 74 is a sintered metal filter sonically welded to plastic outlet tube 44 in opening 62. Other attachment techniques may be used, such as mechanical staking, adhesive bonding, etc.

Auxiliary filter element 74 is in pressure tap opening 62 between fitting 68 and the interior 64 of plastic outlet tube 44. Pressure tap opening 62 has a first section 80, FIG. 2, of a first diameter and extending inwardly through the sidewall from the exterior of plastic outlet tube 44. Pressure tap opening 62 has a second section 82 of a second diameter and extending outwardly through the sidewall from the interior 64 of plastic outlet tube 44. The noted first diameter is greater than the noted second diameter. Fitting 68 is in first section 80. Auxiliary filter element 74 is in second section 82. Pressure tap opening 62 has a third section 84 of a third diameter and extending through the sidewall between second section 82 and the interior 64 of plastic outlet tube 44. The noted second diameter is greater than the noted third diameter. Second and third sections 82 and 84 meet at an annular shoulder 86 such that shoulder 86 provides a stop preventing entry of auxiliary filter element 74 into interior 64 of plastic outlet tube 44 and the clean side 38 of main filter element 30. Pressure tap opening 62 has a fourth section 88 extending through the sidewall between sections 80 and 82 and defined by a frustoconical taper. Auxiliary filter element 74 is also in section 88.

Figure 3:
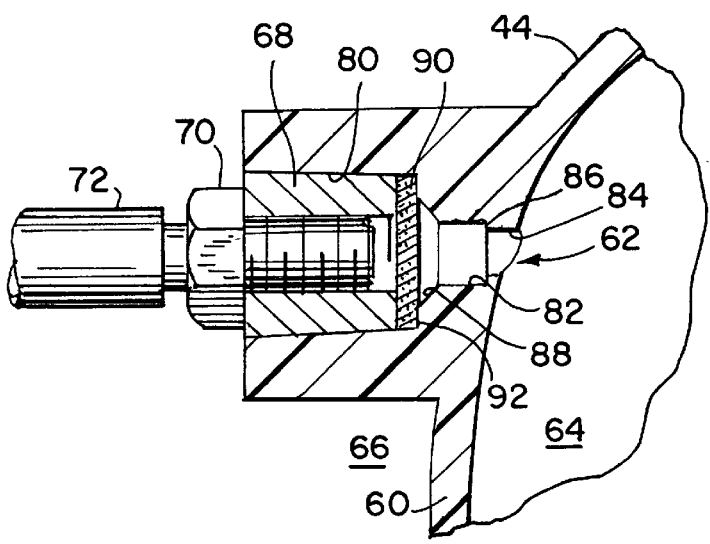
FIG. 3 is a view like FIG. 2 and shows an alternate embodiment.

FIG. 3 shows another embodiment, and uses like reference numerals as above where appropriate to facilitate understanding. Auxiliary filter element 90 is shorter and wider and more disc-like than auxiliary filter element 74, FIG. 4. Auxiliary filter element 90 is in section 80. Pressure tap opening 62 has an annular shoulder 92 between sections 80 and 82. Auxiliary filter element 90 is stopped against annular shoulder 92 such that shoulder 92 provides a stop preventing entry of auxiliary filter element 90 into interior 64 of plastic outlet tube 44 and the clean side 38 of main filter element 30. Auxiliary filter element 90 is trapped between fitting 68 and annular shoulder 92. Section 88 is defined by the noted frustoconical taper having a smallest diameter equal to the diameter of section 82 and merging therewith, and having a largest diameter less than the diameter of section 80 and merging with shoulder 92 at section 80.

In a further embodiment, members 68 and 70 are a single integral piece having an outwardly extending tube at 94, FIG. 4, with an annular bead 96, barbs, or the like, receiving and retaining a pressure sensor connector provided by hose 72.

As noted in the background section of the parent application, a fitting is provided in the pressure tap opening for receiving a pressure sensor connector. The fitting typically includes an auxiliary filter element affixed thereto to prevent contamination of the interior of the outlet tube and the clean side of the main filter element. As above noted, in continuing development efforts directed toward weight and/or cost reduction, metal components are increasingly being replaced by plastic components, including housings and/or outlet tubes. In the case of a plastic outlet tube, a problem exists creating possible exposure of the interior of the outlet tube and the clean side of the main filter element to contamination from the pressure tap opening. The noted fitting in the pressure tap opening is typically metal and typically internally threaded for receiving a pressure sensor connector. When not in use, the connector is removed, and the pressure tap opening is closed by a plug or bolt threaded into the fitting. The metal fitting is typically externally knurled, and is preset or sonically welded to the plastic outlet tube. When the pressure sensor connector or the plug is tightened into the metal fitting, it is possible to overtorque the latter and twist it out of or at least loosen it from the opening in the plastic outlet tube, due to the lower tensile strength of the plastic. In this marmer, the metal fitting can fall out or otherwise become detached from the plastic outlet tube, which in turn creates a contaminating bypass through the pressure tap opening into the interior of the plastic outlet tube and the clean side of the main filter element.

The parent invention addresses and solves the noted problem and eliminates the possible contaminating bypass through the pressure tap opening to the interior of the plastic outlet tube and the clean side of the main filter element. Instead of affixing the auxiliary filter element to the metal fitting or otherwise making the auxiliary filter element part of the fitting, the auxiliary filter element is instead affixed to the plastic outlet tube in the pressure tap opening. The auxiliary filter element remains in the pressure tap opening if the metal fitting becomes dislodged from the plastic outlet tube and falls out of the pressure tap opening, such that the auxiliary filter element continues to protect the clean side of the main filter element and eliminates a possible contaminating bypass thereto through the pressure tap opening.

Present Invention

FIG. 5 shows an air filter 102 similar to that above described, and including a plastic housing 104 having an air inlet 106, FIG. 6, and an air outlet 108. A cylindrical annular main filter element 110, like 30, FIG. 1, in housing 104 filters air passing from air inlet 106 to air outlet 108. The filter element has a dirty side 112 receiving air from air inlet 106 through an annular space like 32 in FIG. 1, and a clean side 114 passing filtered air to air outlet 108. A plastic outlet tube 116 extends from air outlet 108 and conducts air therefrom. Plastic outlet tube 116 has a sidewall 118 with a pressure tap opening 120 therethrough communicating between the interior and exterior of the plastic outlet tube, for sensing pressure in the plastic outlet tube. A plastic fitting tube 122 extends from plastic outlet tube 116 at pressure tap opening 120 and is externally threaded at 124, FIGS. 5–7, at its outer end for receiving a pressure sensor connector 126. An internal reinforcement member 128 is provided in plastic fitting tube 122 and resists breakage of the latter.

Housing 104 is a cylindrical member extending along an axis 130, FIG. 6, and has a cylindrical outer sidewall 132. Plastic outlet tube 116 is cylindrical and extends from housing end 134 coaxially along axis 130 and has the noted cylindrical sidewall 118 spaced radially inwardly of outer sidewall 132 of housing 104 by an annular disc-shaped end plate 136. Plastic fitting tube 122 extends from sidewall 118 of outlet tube 116 along annular disc-shaped end plate 136.

In preferred form, the rightward portion of housing 104 is an integral singular one-piece molded member, wherein cylindrical outer sidewall 132 annular disc-shaped end plate 136, plastic fitting tube 122 and plastic outlet tube 116 are all an integral single-piece unitary molded member.

Fitting tube 122 is integrally formed with annular disc-shape end plate 136 as a bump in the outer surface thereof on the opposite side thereof from main filter element 110 and projecting axially away therefrom, i.e. rightwardly in FIG. 6. Such bump at 122 extends radially outwardly, i.e. upwardly in FIG. 6, from cylindrical sidewall of 118 of outlet tube 116 to cylindrical outer sidewall 132 of housing 104. The bump at fitting tube 122 has a frusto-conical tapered portion 138 at cylindrical outer sidewall 132 of housing 104, increasing the thickness of such bump at cylindrical outer sidewall 132. Frusto-conical tapered portion 138 is only on the exterior surface of annular disc-shaped end plate 136 external to housing 104 and facing oppositely from main filter element 110.

Fitting tube 122 extends along annular disc-shaped end plate 136 from cylindrical sidewall 118 of outlet tube 116 outwardly beyond cylindrical outer sidewall 132 of housing 104, and is externally threaded at 124, as above noted, for connection to a pressure sensor connector 126. The portion 140 of fitting tube 122 extending beyond outer cylindrical sidewall 132 is subject to the noted breakage. Reinforcement member 128 spans cylindrical outer sidewall 132 of housing 104 and has an inner portion 142 in fitting tube 122 radially inward of cylindrical outer sidewall 132, and has an outer portion 144 in fitting tube 122 radially outward of cylindrical outer sidewall 132. This resists the noted breakage. In one embodiment, reinforcement member 128 is a hollow tubular metal member. In another embodiment, FIG. 8, reinforcement member 146 is of porous material.

An auxiliary filter element 148, like 74 in FIGS. 2 and 4, is in fitting tube 122. Auxiliary filter element 148 is affixed to plastic fitting tube 122, as above, and is unaffixed to internal reinforcement member 128. Auxiliary filter element 148 is between internal reinforcement member 128 and the clean side 114 of main filter element 110 and protects the latter from contamination through pressure tap opening 120. Auxiliary filter element 148 in fitting tube 122 is between cylindrical outer sidewall 132 of housing 104 and cylindrical sidewall 118 of outlet tube 116. Auxiliary filter element 148 is between inner portion 142 of internal reinforcement member 128 and cylindrical sidewall 118 of outlet tube 116. In one embodiment, the internal reinforcement member in porous, as shown at 146 in FIG. 8 and may also provide the auxiliary filter element, such that element 148 in FIG. 8 may be deleted, and the auxiliary filtering function is instead performed by porous reinforcement member 146.

It is recognized that various equivalents, alternatives, and modifications are possible within the scope of the appended claims.

What is claimed is:

1. An air filter comprising:
   a housing having an air inlet and an air outlet;
   a main filter element in said housing and filtering air passing from said air inlet to said air outlet, said main filter element having a dirty side receiving air from said air inlet, and having a clean side passing filtered air to said air outlet;
   a plastic outlet tube extending from said air outlet and conducting air therefrom, said plastic outlet tube having a sidewall with a pressure tap opening therethrough communicating between the interior and exterior of said plastic outlet tube, for sensing pressure in said plastic outlet tube;
   a plastic fitting tube extending from said plastic outlet tube at said pressure tap opening for receiving a pressure sensor connector;
   an internal reinforcement member in said plastic fitting tube resisting breakage of the latter.

2. The air filter according to claim 1 wherein:
   said housing is a cylindrical member extending along an axis and having a cylindrical outer sidewall;
   said plastic outlet tube is cylindrical and extends from an axial end of said housing coaxially along said axis and has a cylindrical sidewall spaced radially inwardly of said outer sidewall of said housing by an annular disc-shaped end plate;
   said plastic fitting tube extends from said sidewall of said outlet tube along said annular disc-shaped end plate.

3. The air filter according to claim 2 wherein said plastic fitting tube is integrally formed with said annular disc-shaped end plate as a bump in the outer surface thereof on the opposite side thereof from said main filter element and projecting axially away therefrom.

4. The air filter according to claim 3 wherein said bump extends radially outwardly from said cylindrical sidewall of said plastic outlet tube to said cylindrical outer sidewall of said housing, and wherein said bump has a frusto-conical tapered portion at said cylindrical outer sidewall of said housing increasing the thickness of said bump at said cylindrical outer sidewall of said housing.

5. The air filter according to claim 4 wherein said frusto-conical tapered portion is only on the exterior surface of said annular disc-shaped end plate external to said housing and facing oppositely from said main filter element.

6. The air filter according to claim 2 wherein said plastic fitting tube is integrally formed with said annular disc-shaped end plate and extends therealong from said cylindrical sidewall of said outlet tube outwardly beyond said cylindrical outer sidewall of said housing.

7. The air filter according to claim 6 wherein said internal reinforcement member spans said cylindrical outer sidewall of said housing and has an inner portion in said plastic fitting tube radially inward of said cylindrical outer sidewall of said housing and has an outer portion in said plastic fitting tube radially outward of said cylindrical outer sidewall of said housing.

8. The air filter according to claim 2 wherein said cylindrical outer sidewall of said housing, said annular disc-shaped end plate, said plastic fitting tube, and said plastic outlet tube are all an integral single-piece unitary molded member.

9. The air filter according to claim 2 wherein said reinforcement member is a hollow tubular member.

10. The air filter according to claim 9 wherein said reinforcement member is of metal material.

11. The air filter according to claim 2 wherein said reinforcement member is of porous material.

12. An air filter comprising:
   a housing having an air inlet and an air outlet;
   a main filter element in said housing and filtering air passing from said air inlet to said air outlet, said main filter element having a dirty side receiving air from said air inlet, and having a clean side passing filtered air to said air outlet;
   a plastic outlet tube extending from said air outlet and conducting air therefrom, said outlet tube having a sidewall with a pressure tap opening therethrough communicating between the interior and exterior of said plastic outlet tube, for sensing pressure in said plastic outlet tube;

a plastic fitting tube extending from said plastic outlet tube at said pressure tap opening for receiving a pressure sensor connector;

an internal reinforcement member in said plastic fitting tube resisting breakage of the latter; and an auxiliary filter element in said plastic fitting tube.

13. The air filter according to claim 12 wherein said auxiliary filter element is affixed to said plastic fitting tube and unaffixed to said internal reinforcement member.

14. The air filter according to claim 12 wherein said auxiliary filter element is between said internal reinforcement member and said clean side of said main filter element.

15. The air filter according to claim 12 wherein:

said housing is a cylindrical member extending along an axis and having a cylindrical outer sidewall;

said plastic outlet tube is cylindrical and extends from an axial end of said housing coaxially along said axis and has a cylindrical sidewall spaced radially inwardly of said outer sidewall of said housing by an annular disc-shaped end plate;

said plastic fitting tube extends from said sidewall of said outlet tube along said annular disc-shaped end plate;

said auxiliary filter element is in said plastic fitting tube between said cylindrical outer sidewall of said housing and said cylindrical sidewall of said plastic outlet tube.

16. The air filter according to claim 12 wherein:

said housing is a cylindrical member extending along an axis and having a cylindrical outer sidewall;

said plastic outlet tube is cylindrical and extends from an axial end of said housing coaxially along said axis and has a cylindrical sidewall spaced radially inwardly of said outer sidewall of said housing by an annular disc-shaped end plate;

said plastic fitting tube extends from said sidewall of said outlet tube along said annular disc-shaped end plate and is integrally formed therewith and extends radially outwardly beyond said cylindrical outer sidewall of said housing;

said internal reinforcement member spans said cylindrical outer sidewall of said housing and has an inner portion in said plastic fitting tube radially inward of said cylindrical outer sidewall of said housing and has an outer portion in said plastic fitting tube radially outward of said cylindrical outer sidewall of said housing.

17. The air filter according to claim 16 wherein said auxiliary filter element is between said inner portion of said internal reinforcement member and said cylindrical sidewall of said plastic outlet tube.

18. The air filter according to claim 12 wherein said internal reinforcement member is porous and provides said auxiliary filter element.

* * * * *